United States Patent [19]

Lee et al.

[11] 4,415,678

[45] Nov. 15, 1983

[54] REMOVAL OF SULFATE IONS FROM BRINE USING AMORPHOUS POLYMERIC ZIRCONIUM OXIDE FORMED WITHIN A MACROPOROUS POLYMER MATRIX

[75] Inventors: John M. Lee; William C. Bauman, both of Lake Jackson, Tex.

[73] Assignee: The Dow Chemical Company, Midland, Mich.

[21] Appl. No.: 307,830

[22] Filed: Oct. 2, 1981

[51] Int. Cl.³ .............................................. B01J 39/18
[52] U.S. Cl. ..................................................... 521/28
[58] Field of Search ......................................... 521/28

[56] References Cited

U.S. PATENT DOCUMENTS 2,809,943  10/1957  Pye et al. .............................. 521/28

FOREIGN PATENT DOCUMENTS 732817  6/1955  United Kingdom .................. 521/28

*Primary Examiner*—Joseph L. Schofer
*Assistant Examiner*—Peter F. Kulkosky
*Attorney, Agent, or Firm*—W. J. Lee

[57] ABSTRACT

Preparation and use of novel cation exchange composites are described, said composites comprising polymers having sulfonic acid functional groups which have ionically attached thereto, in the resin phase, amorphous polymer hydrous zirconium oxide groups. These compositions are useful, e.g., for removing sulfate values from NaCl brine.

10 Claims, No Drawings

REMOVAL OF SULFATE IONS FROM BRINE USING AMORPHOUS POLYMERIC ZIRCONIUM OXIDE FORMED WITHIN A MACROPOROUS POLYMER MATRIX

BACKGROUND OF THE INVENTION

Various alkali metal halide aqueous solutions or alkaline earth metal halide aqueous solutions, e.g., NaCl brine or $MgCl_2$ brine, contain sulfate, borate, bicarbonate, or dihydrophosphate values or ions which are considered detrimental if the aqueous solution is intended for use in certain applications, such as in electrolytic processes. There are commercial incentives to substantially removing the sulfate ions.

It is known that hydrous zirconium oxide and other zirconium compounds, such as zirconium phosphates, are useful as inorganic ion exchangers.

SUMMARY OF THE INVENTION

An amorphous polymeric zirconium hydrous oxide is formed within the resin phase of beads of a macroporous cation exchange resin of the sulfonic acid type, thereby forming novel ion exchange composite structures which are useful in removing, e.g., sulfate, borate, bicarbonate, or dihydrophosphate ions from alkali metal halide brines.

DETAILED DESCRIPTION

It is known that zirconium hydroxide is prepared by alkali precipitation of an aqueous solution of a zirconyl salt. For the present invention it is preferred that the alkali be ammonia since it is more easily washed out than the alkali metal hydroxides or alkaline earth metal hydroxides. Precipitation at cold (ambient) temperature gives a gelatinous product which is substantially $Zr(OH)_4$ containing about 26.5% water or more. A partially dehydrated zirconyl hydroxide, $ZrO(OH)_2$, results from drying it at elevated temperature (e.g., 100° C.), or from hot-precipitation (e.g., 85° C.) followed by hot drying.

Thus, in the present invention the expression "hydrous zirconium oxide" has within the purview of its meaning any of the various amorphous hydrated forms of zirconium oxide which are substantially or largely insoluble in plain water.

The macroporous cation exchange resin is one which contains sulfonic acid ($SO_3^-$) functional group. Such resins are available commercially, such as sulfonated polymers of styrene crosslinked with divinylbenzene. For instance a macroporous cation exchange resin with $SO_3^-Na^+$ or $SO_3^-H^+$ groups affixed to a styrene-divinyl-benzene resin structure is sold by The Dow Chemical Company under the tradename DOWEX MSC-1-$Na^+$ and DOWEX MSC-1-$H^+$. It is within the purview of the present invention to use any macroporous cation exchange resin containing sulfonic acid functional groups, so long as the resin is substantially inert or non-reactive, when used in the present invention, except for the reactivity of the sulfonic acid functionality groups.

In general, the polymeric zirconium hydrous oxide is formed within the resin beads by thoroughly wetting the resin with an aqueous solution of a soluble zirconyl compound, such as $ZrOCl_2.8H_2O$. Excessive zirconyl solution should be drained off and the resin thoroughly washed with water to substantially remove the zirconyl compound from the void spaces (pores) of the resin, leaving only that which is taken up into the resin phase, then is optionally dried, such as by air-drying. The dried resin, containing the zirconyl compound is neutralized, preferably by use of $NH_4OH$, thereby forming polymeric $ZrO(OH)_2$. Excess $NH_4OH$ and $NH_4Cl$ (which forms) is washed out, such as by repeated contact with NaCl brine. The composite is acidified, such as with HCl.

In the general process outlined above, the beginning zirconyl or zirconium compound may be $ZrOCl_2.xH_2O$ or the like, such as $Zr(NO_3)_4.5H_2O$, $ZrOBr_2.xH_2O$, $ZrOI_2.8H_2O$, or $Zr(SO_4)_2.4H_2O$, or any such zirconium compound which will precipitate to form $ZrO(OH)_2$ when contacted with a base, especially $NH_4OH$. The so-formed $ZrO(OH)_2$, also called "zirconium hydrous oxide", is an amorphous, polymeric structure. Following the above alkalizing step, the acid used for lowering the pH is preferably HCl, but may also be HBr, HI, $NHO_3$, and the like.

The present invention relies, in part, on the step of substantially washing the zirconyl compound, such as $ZrOCl_2$, from the void spaces (pores) of the resin, leaving only the zirconyl compound within the resin phase. Adequate washing with water is determined by analyzing the wash water to determine that substantially no further $ZrO^{++}$ or $Cl^-$ (or other salt ions) is being removed. The washing is done with salt-free water so as not to remove the zirconyl compound from the resin phase.

In one representative embodiment there is used a macroporous crosslinked styrene-divinylbenzene copolymer which has been sulfonated to about one $-SO_3^-H^+$ group per benzene ring. The beads have about 30-40% porosity and a surface area of about 40-50 $M^2/gm$. The preferred product contains one Zr atom for each two $-SO_3H$ groups, having been formed by exchanging all of the $H^+$ ions in the resin for $ZrO^{++}$ ions from excess $ZrOCl_2$ solution. At this intermediate stage the product is specifically a styrene-divinylbenzene polymer network with affixed $-(SO_3^-)_2-ZrO^{++}$ ionic groups. The close proximity of the $ZrO^{++}$ ions and the $R-SO_3^-$ ions is maintained during the reaction with

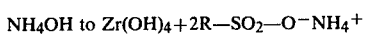

and with NaCl and HCl to the final product

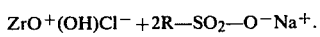

This close proximity enhances removal of $Na_2SO_4$ by water, after the $Cl^-$ has been exchanged to $SO_4^=$.

The range of ratios of Zr/S of ~0.4 to ~0.6 is an operable range; preferably, though, the ratio is around or about 0.5.

When using a crosslinked copolymer of styrene-divinylbenzene as the sulfonated polymer for use as a cation exchange resin, it is preferred that the divinylbenzene content of the copolymer be in the range of about 6-20%, preferably around or about 10%.

As stated above, once the resin has been acidized, the composite is ready to take on $SO_4^=$ values from brine. This is done, for example, by placing the composite in a vessel, preferably a column, and passing sulfate-containing brine through the composite until the composite is substantially "loaded" with $SO_4^=$ values and is ready for another water-washing.

It is within the purview of this invention that the alkali metal salt brine may be a natural brine, such as seawater or mineral brine, a LiCl brine, a KCl brine, or an alkali metal salt brine which comes from an ore dressing, ore leaching, mineral dressing, and the like. The alkali metal brine may contain only a small amount, say, less than about 1% of hardness values; preferably the hardness values are less than about 0.1%. The present novel composite exhibits a high affinity for, and a strong preference for, $SO_4^=$, $BO_2^-$, $HCO_3^-$, and $H_2PO_4^-$ ions.

In contacting the influent brine with the exchange resin composite in accordance with the present invention, it is preferred to operate at about 40° C. to about 60° C. using a brine pH between about 1–2, using a contact flow rate of about 0.05 to about 0.1 bed volumes per minute (BVPM), and using a counterflow water-wash to regenerate the resin once it is loaded with the sulfate or borate or other ions being removed from the brine. At a pH below about 1 and using a concentrated metal chloride brine, some solubility of $ZrOCl_2$ is likely to be encountered, especially at high temperature. By operating at a pH above about 1.5 (but still at an acid pH) higher temperature of up to 100° C., or even close to boiling point of the brine, are permissible; at 40° C.–60° C., flow rates greater than 0.1 BVPM may cause leakage and an early breakthrough of the sulfate, borate, or other ions sought to be removed from the brine. At pH of 2 and temperature of 100° C., efficient operation may be obtained at 0.2 BVPM.

As stated above, counterflow of the water-wash to regenerate the resin composite is preferred, but co-flow is operable, though at lower efficiency.

The following example is intended to illustrate the present invention, but the invention is not limited to the particular example shown.

EXAMPLE 1

About 150 ml of DOWEX MSC-1 in $H^+$ form, having a mesh size of about 20–50 (U.S. standard sieve size) was washed with water and loaded into a glass column. A 15% $ZrOCl_2$ aqueous solution was flowed down through the resin until the effluent gravity reached 1.10 gms/cc. Then about 25 ml of 32% $ZrOCl_2$ aqueous solution was fed in, followed by 1 liter of water. Rinse water was flowed until neither $ZrO^{++}$ or $Cl^-$ could be detected in the effluent. This thorough washing removed excess $ZrOCl_2$ from the voids (pores) of the resin, but did not remove the ionically held groups from the $SO_3^-$ groups in the resin phase.

The resin was removed from the column and treated with excess $NH_4OH$ (about 25 ml of 30% $NH_3$). The resin was washed free of excess $NH_4OH$ and $NH_4Cl$ (which forms), immersed in 26% NaCl, and titrated with 1 N HCl to 1.5 pH (requiring 87 meq. HCl). The settled volume of the final resin was 144 ml.

116 ml of the resin was loaded into a temperature controlled jacketed glass column and contacted with 1.5 pH 26% NaCl (containing 2000 mg/l $SO_4^=$) upflow at 10 ml/min and 65° C. No $SO_4^=$ was detectable in the effluent until 850 ml when a breakthrough of 100 ppm $SO_4^=$ was observed. A total 26% NaCl flow of 1000 ml was achieved with a composite analysis of 173 mg/L $SO_4^=$.

The $SO_4^=$ was eluted downflow with deionized water at 3.2 ml/min. at 65° C. The effluent was collected in cuts and analyzed for $SO_4^=$ content, with the following results:

| Effluent Cuts from Downflow Water Regeneration | | |
| --- | --- | --- |
| Cut # | Vol. (ml) | $SO_4^=$ (g/L) |
| 1 | 50 | 1.2864 |
| 2 | 25 | 1.2096 |
| 3 | 10 | 1.3824 |
| 4 | 10 | 2.0256 |
| 5 | 10 | 10.944 |
| 6 | 10 | 12.000 |
| 7 | 10 | 10.848 |
| 8 | 10 | 8.928 |
| 9 | 10 | 7.8048 |
| 10 | 10 | 6.768 |
| 11 | 10 | 6.000 |
| 12 | 10 | (not analyzed) |
| 13 | 10 | 4.3680 |
| 14 | 10 | 3.8093 |
| 15 | 25 | 3.0912 |
| 16 | 50 | 2.2464 |

After this downflow water regeneration, 26% NaCl upflow at 10 ml/min. and 65° C. was resumed. No $SO_4^=$ was detected in the effluent until 500 ml had been purified, at which time about 100 ppm of $SO_4^=$ broke through. The composite analysis of the first 500 ml of 26% NaCl was 76.8 mg/l $SO_4^=$.

We claim:

1. A macroporous cation exchange resin composite having attached thereto in the resin phase sulfonic acid functional groups, said functional groups being ionically combined by post reaction with amorphous polymeric hydrous zirconium oxide, there being substantially little or no uncombined amorphous polymeric hydrous zirconium oxide in the void or pore phase of the resin.

2. The composite of claim 1 wherein the resin comprises a crosslinked copolymer of styrene and divinylbenzene, said sulfonic acid functional groups being attached to benzene rings of the copolymer.

3. The copolymer of claim 2 wherein the divinylbenzene comprises about 6% to about 20% of the combined weight of styrene and divinylbenzene.

4. The copolymer of claim 2 wherein the divinylbenzene comprises around or about 10% of the combined weight of styrene and divinylbenzene.

5. A method for preparing a composite of, a macroporous cation exchange resin having attached thereto, in the resin phase, sulfonic acid functional groups ionically combined with amorphous polymeric hydrous zirconium oxide, said method comprising adding an aqueous solution of at least one zirconyl or zirconium salt to a particulate, macroporous, cation exchange resin having sulfonic acid functional groups, thereby causing the resin phase to imbibe zirconyl salt values, washing excess zirconyl or zirconium salt from the void or pore phase of the resin, using water as the wash liquid, alkalizing the so-formed composite to convert the zirconyl salt to an amorphous polymeric hydrous zirconium oxide which remains in the resin phase.

6. The method of claim 5 wherein the zirconyl or zirconium salt is at least one selected from the group comprising $ZrOCl_2$, $Zr(NO_3)_4$, $ZrOBr_2$, $ZrOI_2$, and $Zr(SO_4)_2$ and hydrates thereof.

7. The method of claim 5 wherein the resin comprises a crosslinked copolymer of styrene and divinylbenzene having sulfonic acid functional groups attached thereto.

8. A method which employs the composite prepared in accordance with claim 5, said method comprising placing the said composite in a vessel adapted for use as an ion exchange vessel, flowing through said resin an alkali metal brine containing unwanted sulfate, borate, bicarbonate or dihydrophosphate ions, thereby causing said unwanted ions to be trapped by said resin, ceasing the flow of said brine when the resin is loaded with the unwanted ions, as indicated by breakthrough of said ions in the effluent brine, and regenerating said resin by water-washing to remove the so-trapped ions.

9. The method of claim 8 wherein the resin comprises a crosslinked copolymer of styrene and divinylbenzene having sulfonic acid functional groups attached thereto.

10. The method of claim 9 wherein the brine comprises concentrated NaCl containing sulfate ions to be removed.

* * * * *

UNITED STATES PATENT AND TRADEMARK OFFICE
CERTIFICATE OF CORRECTION

PATENT NO. : 4,415,678

DATED : November 15, 1983

INVENTOR(S) : John M. Lee and William C. Bauman

It is certified that error appears in the above—identified patent and that said Letters Patent is hereby corrected as shown below:

On cover sheet under [57] Abstract, line 6, "positions" should be -- posites --.

Col. 2, line 18, "$NHO_3$," should be -- $HNO_3$, --.

Col. 3, line 22, "temperature" should be -- temperatures --.

Col. 4, line 28, there should be a comma after the word "phase" it should read -- phase, --.

Signed and Sealed this

Seventeenth Day of April 1984

[SEAL]

Attest:

GERALD J. MOSSINGHOFF

Attesting Officer

Commissioner of Patents and Trademarks